Figure 1:
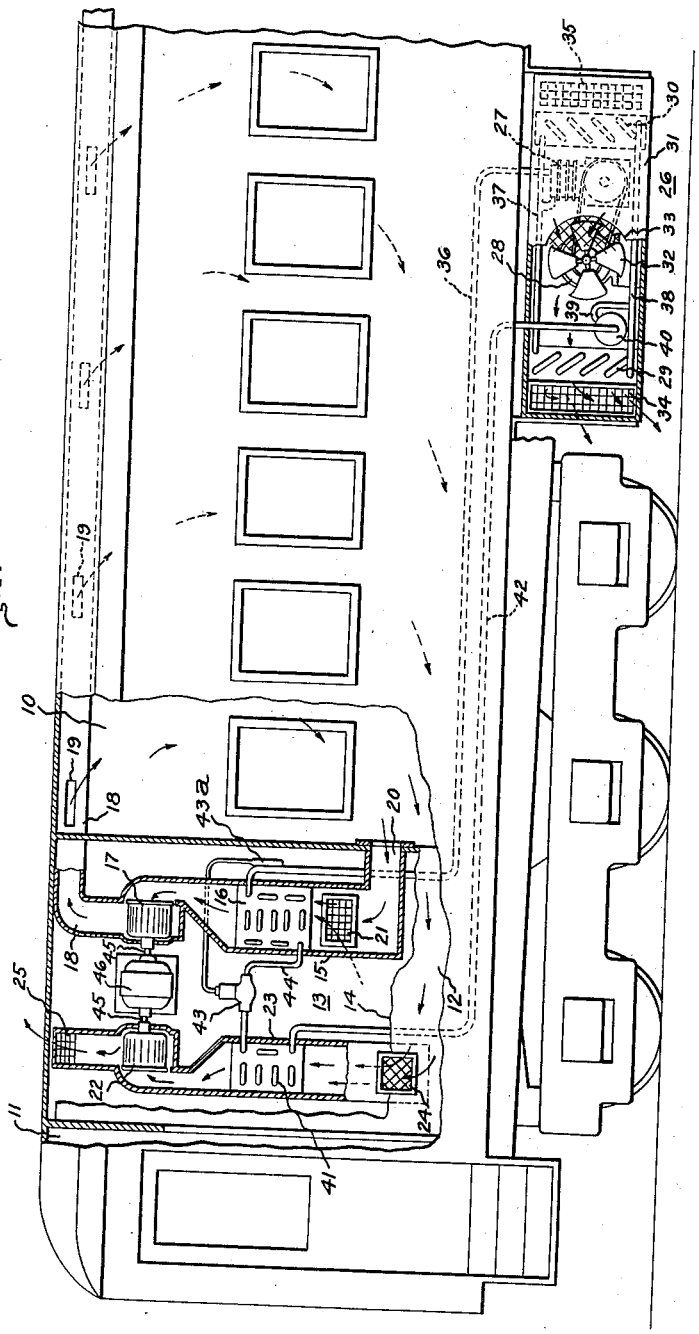

Nov. 30, 1937.  R. L. CHAPMAN  2,100,834
AIR CONDITIONING SYSTEM
Filed July 31, 1936  2 Sheets-Sheet 1

Inventor:
Robert L. Chapman,
by Harry E. Dunham
His Attorney.

Nov. 30, 1937.  R. L. CHAPMAN  2,100,834
AIR CONDITIONING SYSTEM
Filed July 31, 1936  2 Sheets-Sheet 2
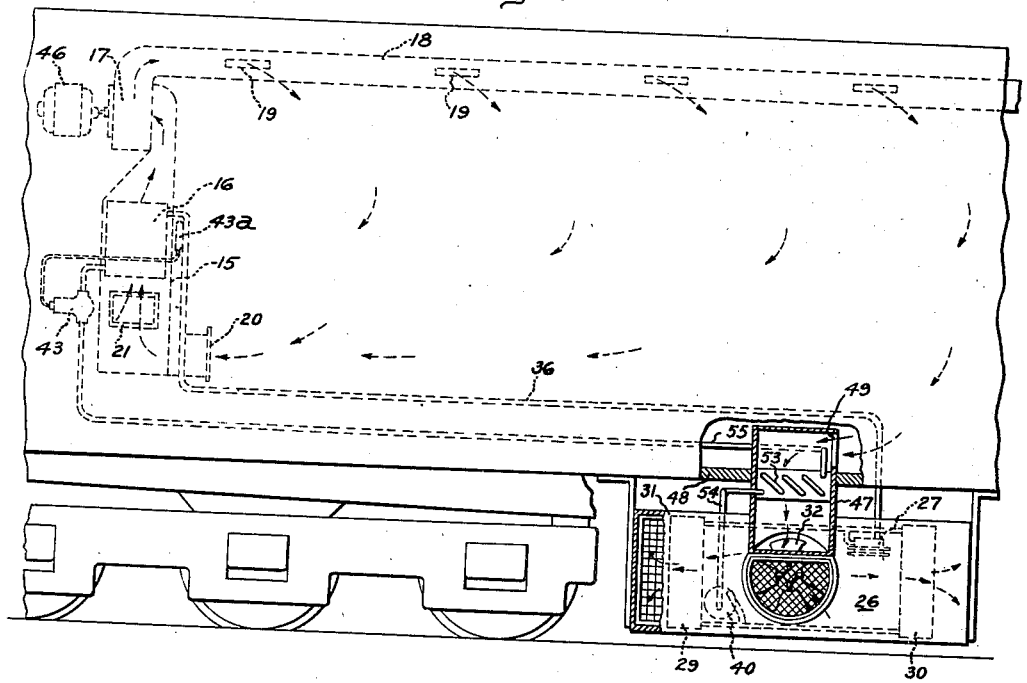
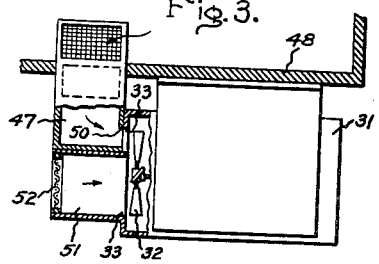
Inventor:
Robert L. Chapman,
by Harry E. Dunham
His Attorney.

Patented Nov. 30, 1937

2,100,834

UNITED STATES PATENT OFFICE 2,100,834

AIR CONDITIONING SYSTEM

Robert L. Chapman, Erie, Pa., assignor to General Electric Company, a corporation of New York Application July 31, 1936, Serial No. 93,645

10 Claims. (Cl. 62—117)

My invention relates to air conditioning systems of the type utilizing mechanical refrigerating machines, and particularly to such systems employed for cooling the air in the passenger space of a railway car or other vehicle.

Modern railway cars are commonly provided with air conditioning systems for maintaining the air within the passenger space of the car sufficiently cooled to provide adequate comfort for the passengers on hot summer days. Since the refrigerating equipment must be carried by the railway car, the capacity thereof is limited because of space, weight and power restrictions. It has been found that in order to provide air in the passenger space which is not objectionable because of odor or staleness, it is necessary to admit a considerable quantity of fresh air to the car and, consequently, an equal quantity of vitiated air must be exhausted from the car. This exchange of fresh for vitiated air represents some loss of cooling effect, since the fresh air is normally at a considerably higher temperature than the exhausted stale air, and it is, therefore, necessary to provide additional refrigerating capacity to make up for this loss. Accordingly, it is an object of my invention to provide an air conditioning system including an enclosure to be conditioned and provided with a refrigerating machine having a condenser and an evaporator and arranged to utilize the cooling capacity of air discharged from the enclosure to increase the effective capacity of a refrigerating machine.

Another object of my invention is to provide a system for conditioning the air within the passenger space of a vehicle employing a mechanical refrigerating machine including a condenser and an evaporator for cooling the air of the passenger space, and an arrangement whereby air exhausted from the passenger space is utilized for subcooling refrigerant liquefied in the condenser.

A further object of my invention is to provide a system for conditioning the air within the passenger space of a vehicle and utilizing a refrigerating machine, having a condenser, a liquid subcooler and an evaporator and in which air exhausted from the passenger space is directed through a duct to cool the liquid subcooler and a portion of the condenser.

Further objects and advantages of my invention will become apparent as the following description proceeds, and the features of novelty which characterize my invention will be pointed out with particularity in the claims annexed to and forming a part of this specification.

For a better understanding of my invention, reference may be had to the accompanying drawings in which Fig. 1 is a side elevation, partly in section, of a portion of a railway car provided with an air conditioning system embodying my invention; Fig. 2 is a view similar to that shown in Fig. 1, illustrating another modification of my invention; and Fig. 3 is an end view, partly in section, of the motor and compressor housing and exhaust air duct shown in Fig. 2.

Referring now to the drawings in Fig. 1, I have shown one end of a passenger railway car having a passenger compartment 10 and an entrance vestibule 11 connected by a corridor 12. A compartment 13 is provided between the passenger space 10 and the vestibule 11 on one side of the car separated from the corridor 12 by a partition 14. Within the compartment 13 is arranged apparatus for circulating and cooling air and for delivering cooled air to the passenger space to condition the air therein. This apparatus comprises a duct 15 within which is arranged an evaporator or cooling element 16 and a fan 17 for circulating air through the duct over the evaporator and into a distributing duct 18. The duct 18 extends along the top of the car and is provided with a plurality of outlet openings 19 for discharging the conditioned air into the upper portion of the passenger space. Air from the passenger space is admitted to the duct 15 through an inlet 20 at the lower end thereof, and fresh air is admitted to the duct 15 through a fresh air inlet opening 21 providing communication between the duct and the air outside the car. The fresh air and the recirculated air are mixed before passing over the evaporator 16 and the mixture is then discharged from the duct 18 by operation of the fan 17 and flows out of the openings 19 and downwardly through the passenger space as indicated by the arrows. A portion of the air is returned to the duct 15 through the inlet 20 to be recirculated. In order to remove a quantity of the stale vitiated air an air discharge fan 22 is provided. This fan is arranged within a duct 23 in the compartment 13 and air from the passenger space enters the duct 23 through an inlet 24 opening into the corridor 12 through the wall 14. This air withdrawn from the corridor passes through the duct 23 and is exhausted from the car by the operation of the fan 22, the exhausted air passing through a discharge opening 25 in the roof of the car. In order to provide refrigerant for cooling the evaporator 16 a condensing unit 26 is provided suspended from the lower side of the car on the outside thereof. The condensing unit is shown mounted on the far side of the car, i. e., on the same side as the compartment 13. The condensing unit comprises a compressor 27 driven by a motor 28 and a condenser comprising coil sections 29 and 30 mounted at either end of the unit and connected in parallel in the refrigerant circuit. The unit is provided with a sheet metal housing 31 and air is circulated through the housing and over the compressor and the condenser by operation of a fan 32 driven by the motor 28. Cooling air enters the housing 31 through a circular opening 33 and passes through the housing and over the compressor 27 and condenser sections 29 and 30 and thence out through openings 34 and 35, thereby cooling the compressor and the condenser.

During the operation of the condensing unit 26 gaseous refrigerant is withdrawn from the evaporator 16 through suction line 36 and is compressed within the compressor 27 and then discharged into a manifold connection 37 from which it flows in parallel to sections 29 and 30 of the condenser. The cooling air circulated over the condenser sections by the fan 32 absorbs heat from the hot compressed refrigerant vapor and the vapor is cooled thereby and liquefied. The liquid refrigerant flows out of the condenser sections 29 and 30 into a liquid manifold 38 from which it flows through a connection 39 into a liquid receiver 40.

The refrigerant liquefied in the receiver 40, although it has been cooled by the air passing over the condenser, is nevertheless at a temperature much higher than that in the enclosure to be conditioned, and it is desirable further to cool the liquid before admitting it to the evaporator, in order to prevent loss of cooling capacity due to the necessity of absorbing the heat of the liquid beyond the expansion valve. I have found that the heat absorbing capacity of the air exhausted from the passenger space may be utilized to advantage to cool the liquid refrigerant before it flows to the evaporator and thereby increase the effective capacity of the compressor. In Fig. 1, I have shown a heat exchange element 41 arranged in the duct 23 and connected in the refrigerant circuit between the liquid receiver 40 and the evaporator. Liquid flows from the receiver 40 through a liquid line 42, passes through the heat exchange element or cooling coil 41, then flows through a thermostatic valve or other flow controlling device 43, having a thermostatic bulb 43a responsive to the temperature of the vaporized refrigerant withdrawn from the evaporator. The refrigerant flows from the valve 43 through a connection 44 to the evaporator 16. The liquid refrigerant flowing through the heat exchanger 41 is cooled by the passage thereover of the vitiated or stale air withdrawn from the car and discharged through the duct 23. The refrigerant cooled and liquefied in the condenser is thereby subcooled in the heat exchanger 41 before passing through the expansion valve 43 and a minimum flashing of refrigerant takes place at the valve. The total heat absorbing capacity of the refrigerating machine is, therefore, increased without necessitating an increase in the capacity of the compressor 27.

The fans 17 and 22 have been shown arranged on a single shaft 45 driven by a common motor 46. The motor 46 may be run continuously and thereby provide continuous ventilation of the passenger space by the addition of fresh air through the inlet 21 and the discharge of stale air through the outlet 25. The apparatus shown may be of sufficient capacity to condition the entire car, or a separate identical system may be provided in the other end of the car, if desired.

In Figs. 2 and 3 I have shown another embodiment of my invention in which the air exhausted from the passenger space is utilized not only to subcool the liquid refrigerant, but is also mixed with the condenser cooling air. The condenser cooling fan is utilized also to exhaust the air from the passenger space and a separate exhaust fan is not necessary. The arrangement of the circulating and cooling apparatus within the car is substantially the same as that shown in Fig. 1, except for the location of the exhaust air duct. Corresponding parts of the equipment, therefore, have been designated by the same numerals as used in Fig. 1 except for the parts of the exhaust air and sub-cooling apparatus.

Referring now to Fig. 2, I have shown a portion of one end of a passenger car provided with air cooling and circulating apparatus like that shown in Fig. 1. This apparatus includes the evaporator 16 arranged in duct 15 and the fan 17 driven by the motor 46 for circulating return and fresh air from the openings 20 and 21 over the evaporator 16 and into the passenger space through duct 18 and outlets 19. In order to remove vitiated or stale air from the passenger compartment I provide an exhaust air duct or passage 47 passing through the floor of the car indicated at 48 and having an inlet opening 49 within the passenger space. The duct 47 is arranged adjacent the compressor condenser unit 26 which supplies refrigerant to the evaporator 16, and the duct is provided with an outlet 50 registering with the upper portion of the opening 33 in the compressor condenser housing 31. Below the duct 47 is arranged a short horizontal passage 51 registering with the remaining portion of the opening 33 and provided with a guard screen 52. The condenser fan 32 draws air into the housing 31 from the outside through the passage 51 and from the passenger space through the duct 47. A heat exchange element 53 connected in the refrigerant circuit between the liquid receiver 40 and the expansion valve 43 is arranged within the duct 47 in the path of the exhausted stale air. The element 53 corresponds to the element 41 in Fig. 1 and functions in the same manner. During the operation of the refrigerating machine refrigerant compressed in the compressor 27 and liquefied in the condenser sections 29 and 30 flows into the liquid receiver 40 and then through a connection 54 to the heat exchanger 53 where the liquid refrigerant is cooled by the passage of cool exhaust air through the duct 47. The cooled liquid refrigerant is then conveyed by a liquid line 55 to the expansion valve 43, which controls the flow of refrigerant to the evaporator 16. Liquid refrigerant in the evaporator 16 is vaporized by the absorption of heat from the mixture of fresh and recirculated air passing through the duct 15 and the vaporized refrigerant is withdrawn from the evaporator 16 through suction line 36 and returned to the compressor.

The cooled mixture of fresh and recirculated air is forced by operation of the fan 17 through distribution duct 18 and into the passenger space through outlets 19, the path of the air being indicated by the arrows. The operation of the condenser fan 32 draws fresh air through the passage 51 and exhausted air through the passage 47 and forces the mixture of air through the condenser sections 29 and 30. The exhausted air after passing over the heat exchange element 53 within the duct 47 is normally at a temperature lower than that of the fresh air drawn through the passage 51, and, consequently, the remaining heat absorbing capacity of the exhausted air is available to cool the condenser.

An arrangement whereby a liquid refrigerant sub-cooling coil is arranged in a duct to heat condenser cooling air prior to its passage over the condenser is described and claimed in a co-pending application of Olaf M. Olson, Serial No. 93,613, filed July 31, 1936 and assigned to General Electric Company, assignee of my present invention. I do not therefore herein claim anything claimed in the said Olson application which is to be regarded as prior art with respect to the present application.

From the foregoing it is apparent that I have provided a simple and efficient arrangement for utilizing the heat absorbing capacity of stale air exhausted from an enclosure to be conditioned for increasing the effective capacity of the condensing unit of a mechanical refrigerating machine utilized for cooling the air in the enclosure. Furthermore, I have provided an air conditioning system which is particularly applicable to the cooling of the passenger spaces of vehicles such as railway cars.

While I have shown and described my invention in connection with an air conditioning system for railway passenger cars, it will be understood that it is applicable to other types of air conditioning systems. I do not, therefore, desire my invention to be limited to the particular construction shown and described, and I intend in the appended claims to cover all modifications thereof which do not depart from the spirit and scope of my invention.

What I claim as new and desire to secure by Letters Patent of the United States is:

1. An air conditioning system including an enclosure to be conditioned, means for circulating air through said enclosure, a refrigerating machine having a refrigerant circuit including a condenser and an evaporator, means for circulating over said condenser cooling fluid from outside said enclosure to cool said condenser, said evaporator being arranged in the path of the air circulating through said enclosure, means for discharging air from said enclosure, and means including a heat exchange element connected in the refrigerant circuit of said refrigerating machine between said condenser and said evaporator and arranged in the path of only the air discharged from said enclosure for cooling refrigerant liquefied in said condenser.

2. An air conditioning system including an enclosure to be conditioned and a duct communicating with said enclosure, means for circulating air through said duct and into said enclosure, a refrigerating machine having a refrigerant circuit including a condenser and an evaporator, means for circulating over said condenser cooling fluid from outside said enclosure to cool said condenser, said evaporator being arranged in said duct to cool the air circulating therethrough, means for discharging air from said enclosure, and means including a heat exchange element connected in the refrigerant circuit of said refrigerating machine between said condenser and said evaporator and arranged in the path of only the air discharged from said enclosure for cooling refrigerant liquefied in said condenser.

3. An air conditioning system including an enclosure to be conditioned and a duct communicating with said enclosure, means for circulating air through said duct and into said enclosure, a refrigerating machine having a refrigerant circuit including a condenser and an evaporator, means for circulating over said condenser cooling fluid from outside said enclosure to cool said condenser, said evaporator being arranged in said duct to cool the air circulating therethrough, means including a passage and a fan arranged therein for discharging air from said enclosure, and means including a heat exchange element connected in the refrigerant circuit of said refrigerating machine between said condenser and said evaporator and arranged in said air discharge passage for cooling refrigerant liquefied on said condenser.

4. An air conditioning system including an enclosure to be conditioned and a duct communicating with said enclosure, means for circulating air through said duct and into said enclosure, a refrigerating machine having a refrigerant circuit including a condenser and an evaporator, said evaporator being arranged in said duct to cool the air circulating therethrough, means for discharging air from said enclosure, means for circulating air from outside said enclosure over said condenser to cool said condenser, means including a heat exchange element connected in the refrigerant circuit of said refrigerating machine between said condenser and said evaporator and arranged in the path of only the air discharged from said enclosure for cooling refrigerant liquefied in said condenser, and means for directing said discharged air over said condenser to assist the cooling of said condenser.

5. An air conditioning system including an enclosure to be conditioned and a duct communicating with said enclosure, means for circulating air through said duct and into said enclosure, a refrigerating machine having a refrigerant circuit including a condenser, a liquid refrigerant receiver and an evaporator, means for circulating over said condenser cooling fluid from outside said enclosure to cool said condenser, said evaporator being arranged in said duct to cool the air circulating therethrough, means for discharging air from said enclosure, and means including a heat exchange element connected in the refrigerant circuit of said refrigerating machine between said liquid refrigerant receiver and said evaporator and arranged in the path of only the air discharged from said enclosure for cooling refrigerant liquefied in said condenser.

6. A system for conditioning the air within the passenger space of a vehicle including a refrigerating machine having a condenser and an evaporator connected in the refrigerant circuit thereof, means for circulating over said condenser cooling fluid from outside said enclosure to cool said condenser, means circulating air over said evaporator for cooling the air within said passenger space, means for discharging air from said passenger space, and means including a heat exchange element connected in said refrigerant circuit between said condenser and said evaporator and arranged in the path of only the air discharged from said passenger space for cooling refrigerant liquefied in said condenser.

7. A system for conditioning the air within the passenger space of a vehicle including a refrigerating machine having a condenser and an evaporator connected in the refrigerant circuit thereof, means for circulating over said condenser cooling fluid from outside said enclosure to cool said condenser, means circulating air over said evaporator for cooling the air within said passenger space, means for admitting to said air circulating means fresh air from outside said passenger space, means including a passage for discharging air from said passenger space, and means including a heat exchange element connected in said refrigerant circuit between said condenser and said evaporator and arranged in said passage for cooling refrigerant liquefied in said condenser.

8. A system for conditioning the air within the passenger space of a vehicle including a refrigerating machine having a condenser and an evaporator connected in the refrigerant circuit thereof, means including a duct and circulating air over said evaporator for cooling the air within said passenger space, means admitting to said duct fresh air from outside said passenger space, means including a passage solely for discharging air from said passenger space, means including a heat exchange element connected in said refrigerant circuit between said condenser and said evaporator and arranged in said passage for cooling refrigerant liquefied in said condenser, and means for circulating over said condenser air from outside said passenger space and said air discharged from said passenger space.

9. A system for conditioning the air within the passenger space of a vehicle including a refrigerating machine having a condenser and an evaporator connected in the refrigerant circuit thereof, means including a fan for circulating over said condenser air from outside said passenger space, means circulating air over said evaporator for cooling the air within said passenger space, means including a passage and utilizing said fan for discharging air from said passenger space, and means including a heat exchange element connected in said refrigerant circuit between said condenser and said evaporator and arranged in the path of only the air discharged from said passenger space for cooling refrigerant liquefied in said condenser.

10. A system for conditioning the air within the passenger space of a vehicle including a refrigerating machine having a compressor and a condenser and an evaporator connected in the refrigerant circuit thereof, said compressor and said condenser being arranged outside said passenger space and on the underside of said vehicle, means including a housing and a fan for circulating air over said compressor and said condenser, means circulating air over said evaporator for cooling the air within said passenger space, means including a passage and utilizing said fan for discharging air from said passenger space, and means including a heat exchange element connected in said refrigerant circuit between said condenser and said evaporator and arranged in said passage for cooling refrigerant liquefied in said condenser.

ROBERT L. CHAPMAN.

CERTIFICATE OF CORRECTION.

Patent No. 2,100,834.

November 30, 1937.

ROBERT L. CHAPMAN.

It is hereby certified that error appears in the printed specification of the above numbered patent requiring correction as follows: Page 3, second column, line 16, claim 3, for the word "on" read in; and that the said Letters Patent should be read with this correction therein that the same may conform to the record of the case in the Patent Office.

Signed and sealed this 1st day of February, A. D. 1938.

(Seal)

Henry Van Arsdale,
Acting Commissioner of Patents.